US009802768B2

(12) United States Patent
Overley et al.

(10) Patent No.: US 9,802,768 B2
(45) Date of Patent: Oct. 31, 2017

(54) APPARATUS FOR REORIENTING AND/OR STACKING PRODUCTS

(71) Applicant: The Procter & Gamble Company, Cincinnati, OH (US)

(72) Inventors: Matthew Bernard Overley, Deerfield Township, OH (US); Wesley Bernard Brokopp, Liberty Township, OH (US); Matthew Daniel Dooley, Morrow, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/926,046

(22) Filed: Oct. 29, 2015

(65) Prior Publication Data

US 2017/0121132 A1    May 4, 2017

(51) Int. Cl.
*B65H 43/08* (2006.01)
*B65G 47/24* (2006.01)
*B65G 47/252* (2006.01)
*B65G 57/03* (2006.01)
*B65G 57/14* (2006.01)

(52) U.S. Cl.
CPC .......... *B65G 57/035* (2013.01); *B65G 47/24* (2013.01); *B65G 47/252* (2013.01); *B65G 57/14* (2013.01)

(58) Field of Classification Search
CPC ........ B65G 21/14; B65G 47/31; B65G 43/08; B65G 47/2445; B65G 47/252; B65G 57/06; B65G 57/11; B65G 57/24; B65B 5/101; B65B 5/108; B65H 2301/42266; B65H 2402/351; B65H 31/3081; B65H 2404/3111; B65H 2301/42112; B65H 2301/4223

USPC ........ 193/47, 48; 198/369.7, 394, 411, 412, 198/416, 418.3, 418.4, 418.8, 588, 633; 209/540; 271/73; 414/760, 768, 769, 414/773, 784, 788.9, 789.1, 790.8, 791.3, 414/793.4, 794.2, 794.4, 794.5, 794.6; 53/247, 540, 544
See application file for complete search history.

(56) References Cited

U.S. PATENT DOCUMENTS

| 2,387,674 | A | * | 10/1945 | McIntyre | ............... B23Q 7/165 |
| | | | | | 193/47 |
| 3,144,120 | A | * | 8/1964 | Neibeisel | ............ B28B 23/0018 |
| | | | | | 193/47 |
| 3,627,147 | A | | 12/1971 | Yowell et al. | |
| 3,698,153 | A | * | 10/1972 | Lieberman | ................ B65B 5/08 |
| | | | | | 53/260 |
| 3,713,266 | A | * | 1/1973 | Crow, Jr. | .................. B65B 5/06 |
| | | | | | 206/391 |

(Continued)

*Primary Examiner* — Gregory Adams
(74) *Attorney, Agent, or Firm* — Andrew J. Mueller

(57) ABSTRACT

An apparatus for reorienting and/or stacking products includes a frame and a telescopic infeed associated with the frame. The telescopic infeed has a receiving end and a transfer end. The transfer end is disposed at a first elevation and moveable in a machine direction and in a reverse machine direction. The telescopic infeed advances one or more products in the machine direction; and a landing surface receives the one or more products. The landing surface is disposed in a landing region proximate to the transfer end and at a second elevation. The first elevation is higher than the second elevation. A deflector is operatively engageable with the transfer end, such that the deflector is capable of deflecting a leading end of at least one of the one of more products.

23 Claims, 14 Drawing Sheets

(56) References Cited

U.S. PATENT DOCUMENTS

| | | | | |
|---|---|---|---|---|
| 3,804,228 A * | 4/1974 | Felstehausen | ......... | B65G 21/14 198/431 |
| 3,866,741 A * | 2/1975 | Carbon | ................. | B65G 57/11 198/402 |
| 4,124,967 A * | 11/1978 | Beer | ..................... | B65B 39/007 53/250 |
| 4,210,237 A * | 7/1980 | Gram | ................... | B65G 47/31 198/419.2 |
| 4,302,141 A * | 11/1981 | Miguel | ............... | B65G 59/026 193/47 |
| 4,469,219 A * | 9/1984 | Cosse | .................... | B65G 21/14 198/460.2 |
| 4,629,056 A * | 12/1986 | Simelunas | ........... | B65G 47/252 198/406 |
| 4,711,612 A * | 12/1987 | Kwauka | ................ | B65G 57/06 414/792.6 |
| 4,712,787 A * | 12/1987 | Princiotta, Sr. | ........ | B65H 29/36 271/176 |
| 5,123,231 A * | 6/1992 | Fallas | .................... | B65B 5/101 53/260 |
| 5,301,793 A | 4/1994 | Kovacs | | |
| 5,383,760 A * | 1/1995 | Cawley | ................ | B65G 47/2445 198/415 |
| 5,431,530 A * | 7/1995 | Kobayashi | ............. | B65G 57/11 198/641 |
| 5,461,846 A * | 10/1995 | Cormier | ................. | B65B 39/00 248/100 |
| 5,533,859 A | 7/1996 | McHenry | | |
| 5,699,655 A * | 12/1997 | Kuboyama | ........... | B65B 25/001 53/116 |
| 5,803,706 A * | 9/1998 | Achelpohl | ............. | B65G 57/06 414/793.5 |
| 5,813,196 A * | 9/1998 | Page | ...................... | B65B 5/067 53/171 |
| 6,056,109 A * | 5/2000 | Hidai | ..................... | B65G 43/08 198/431 |
| 6,427,825 B1 * | 8/2002 | Biagiotti | ............... | B65G 47/252 198/411 |
| 6,820,750 B2 * | 11/2004 | Gambini | ................. | B26D 3/16 209/621 |
| 7,021,450 B2 * | 4/2006 | Jones, Jr. | ............... | B65G 21/14 198/116 |
| 7,413,070 B2 * | 8/2008 | Mayer | .................. | B65G 47/715 198/431 |
| 7,788,886 B2 * | 9/2010 | Aquarius | ............... | B65B 5/108 198/411 |
| 2008/0247859 A1 * | 10/2008 | Smets | .................... | B65G 59/08 414/798.5 |

\* cited by examiner

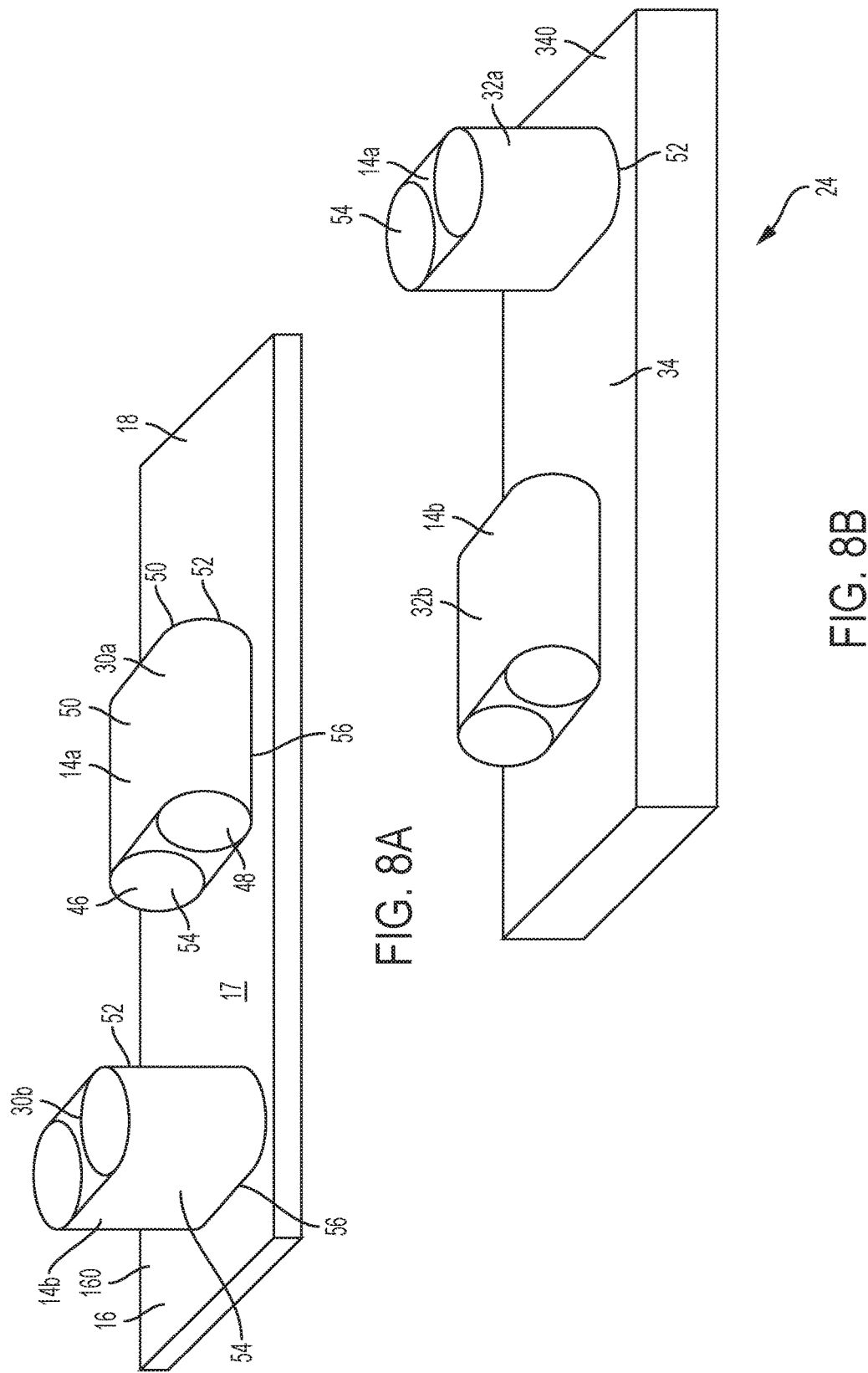

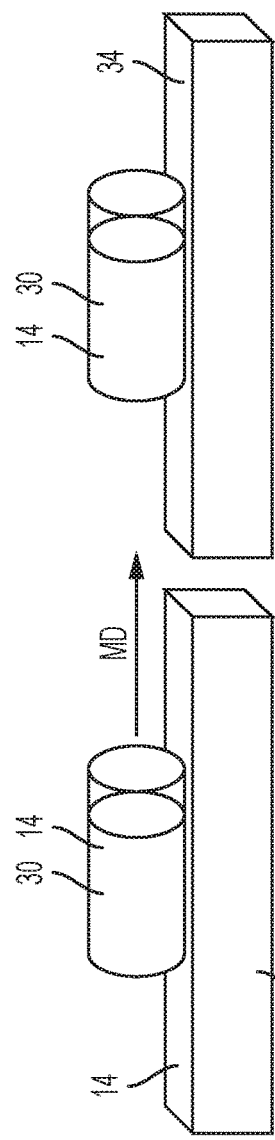
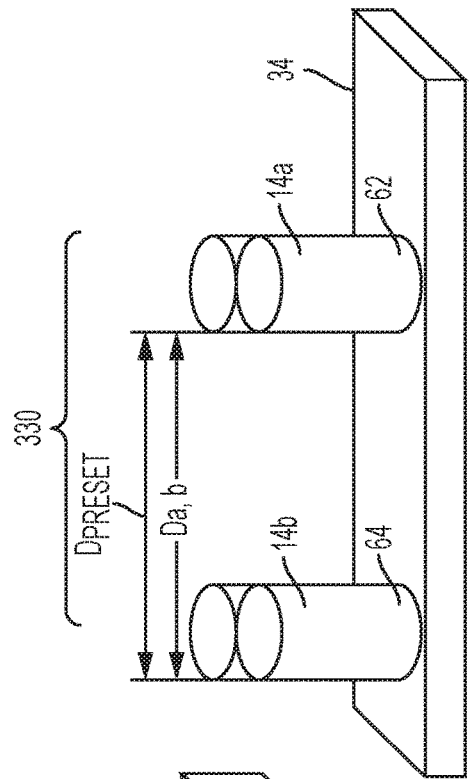
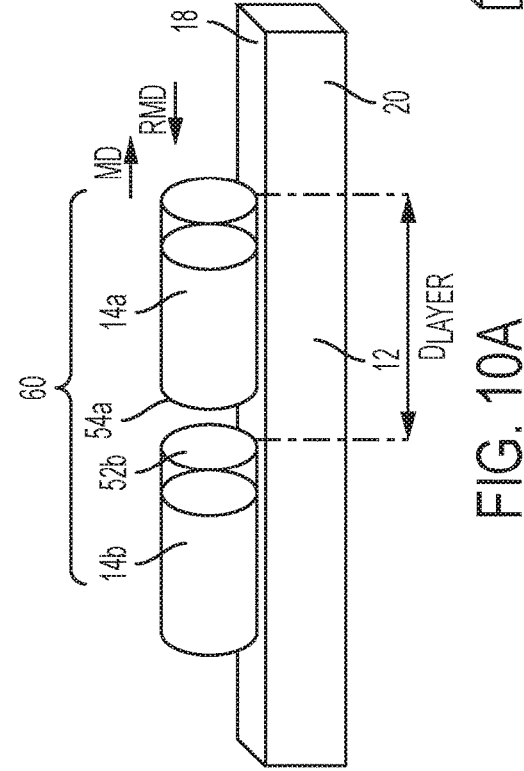

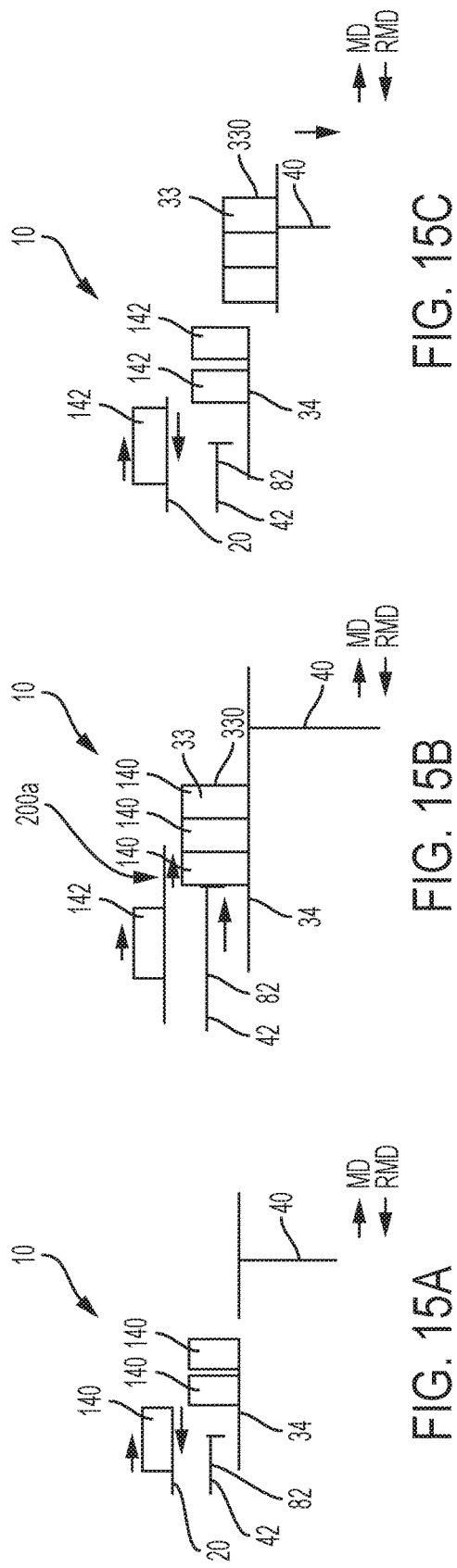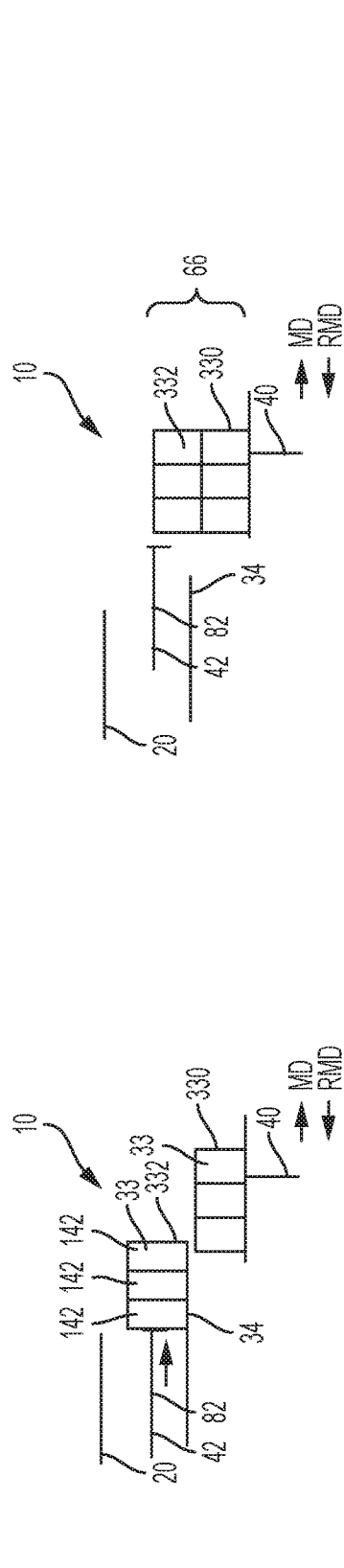

US 9,802,768 B2

1

APPARATUS FOR REORIENTING AND/OR STACKING PRODUCTS

FIELD OF THE INVENTION

The present invention relates to an apparatus and method of reorienting and/or stacking products, more specifically the invention relates to apparatuses and methods for reorienting and/or stacking fibrous structures such as rolled and/or packaged fibrous structures.

BACKGROUND OF THE INVENTION

Manufacturers of packaged goods utilize various techniques and types of equipment for preparing products for packaging, bundling and shipping. Often products need to be reoriented (e.g., upended) when entering or during these operations. Likewise, stacking operations are often necessary to provide the desired number and configuration of products. Known orienting and stacking equipment and processes have limitations that inhibit reliability and efficiency. For instance, many times, different product orientations have different degrees of difficulty, require different process steps and/or have different failure modes. For instance, reorienting a product into a less stable orientation (e.g., from lying on its widest side to lying on a narrower side) is generally more difficult than reorienting a product into a more stable position. Consequently, when manufacturers desire to upend to a less stable orientation, additional process steps or equipment may be necessary to ensure the product lands at the desired orientation and remains in said orientation during subsequent conveyance or other processing. While these additional steps assist with reliability, they can undermine efficiency and add no value when the change in orientation does not warrant the additional steps.

Moreover, known processes typically require upending processes to occur separately and on different equipment from stacking processes. As a result, products have to be moved from one process to the other, involving additional equipment and time and thereby undermining efficiency and reliability, and utilizing a significant amount of floor space.

Therefore, there is a need for equipment and/or a method that permit reorientation and/or stacking of products in a reliable and efficient manner. Further, there is a need for equipment and/or a method that reduces the amount of process steps and/or equipment components necessary for reorientation and/or stacking process. Further still, there is a need for a streamlined, simpler apparatus and/or process that reduces the amount of space, capital costs, and maintenance required for stacking and/or reorienting transformations. Likewise, there is a need for an apparatus that can combine stacking and reorientation operations such that one or both operations can be performed at a given time.

SUMMARY OF THE INVENTION

In an embodiment, an apparatus for reorienting and/or stacking products includes a frame, a telescopic infeed associated with the frame, and a landing surface. The telescopic infeed has a receiving end and transfer end. The transfer end is disposed at a first elevation and is moveable in a machine direction and in a reverse machine direction. The telescopic infeed is capable of advancing one or more products in the machine direction. The landing surface can receive the one or more products. The landing surface is disposed in a landing region proximate to the transfer end and at a second elevation, wherein the first elevation is higher than the second elevation. The apparatus further includes a deflector operatively engageable with the transfer end, such that the deflector is capable of deflecting a leading end of at least one of the one of more products.

In another embodiment, an apparatus for reorienting and/or stacking includes a frame, an infeed associated with the frame, and a shiftable landing surface. The infeed is capable of advancing one or more products in a machine direction and has a receiving end and a transfer end. The transfer end is disposed at a first elevation. The shiftable landing surface can receive the one or more products and is disposed in a landing region proximate to the transfer end and at a second elevation. The shiftable landing surface includes a securing mechanism. The first elevation is higher than the second elevation, and the shiftable landing surface is capable of shifting to receive a first product at a first position and a second product at a second position.

BRIEF DESCRIPTION OF THE DRAWINGS

FIGS. 8A and 8B are schematic representations of portions of an apparatus in accordance with nonlimiting embodiments of the present invention;

FIG. 9 is a schematic representation of portions of an apparatus in accordance with yet another nonlimiting embodiment of the present invention;

FIGS. 10A and 10B are schematic representations of portions of an apparatus in accordance with nonlimiting embodiments of the present invention;

FIGS. 15A-15E are schematic representations of the progression of products in accordance with yet another nonlimiting embodiment of the present invention.

DETAILED DESCRIPTION OF THE INVENTION

Definitions

"Telescopic infeed" as used herein means that the infeed has a variable length, wherein one or more ends of the infeed is moveable in a direction substantially parallel to the direction of product flow (i.e., the machine direction). The telescopic infeed may be automated and/or programmable. In one nonlimiting example, a telescopic infeed is a telescopic conveyor.

"Indexing" or "index" as used herein with respect to movement means a component makes discrete movements between discrete positions. By way of nonlimiting example, an indexing component may move for a distance then pause or slow down before increasing in speed and moving to another position.

"Above", "over", "higher", "below", "under" and "lower" and similar words and phrases relating to orientation as used herein to describe embodiments are to be construed relative to the normal orientation, where articles expressed as being above, over, higher and the like are located elevationally closer to the sky than the items to which they are being compared. Similarly, articles expressed as being below, beneath or under and the like are located elevationally further from the sky than their respective comparators.

"Fibrous structure" as used herein means a structure that comprises one or more fibrous elements. In one example, a fibrous structure according to the present invention means an association of fibrous elements that together form a structure capable of performing a function. Nonlimiting examples of fibrous structures of the present invention include paper (such as a sanitary tissue product) and fabrics (including woven, knitted, and non-woven).

"Sanitary tissue product" as used herein means a soft, relatively low density fibrous structure useful as a wiping implement for post-urinary and post-bowel movement cleaning (toilet tissue), for otorhinolaryngological discharges (facial tissue), multi-functional absorbent and cleaning uses (paper towels) and wipes, such as wet and dry wipes. The sanitary tissue product may be convolutely wound upon itself about a core or without a core to form a sanitary tissue product roll or the sanitary tissue product may be in the form of discrete sheets. The sanitary tissue product can be single-ply or multi-ply.

"Machine Direction" or "MD" as used herein means the direction of the flow of a product through the product making machine and/or manufacturing equipment (such as reorientation or stacking equipment).

"Cross Machine Direction" or "CD" means the direction perpendicular to the machine direction.

"Reverse Machine Direction" or "RMD" means the direction parallel to and opposite of the machine direction.

Overview

Figure 1:
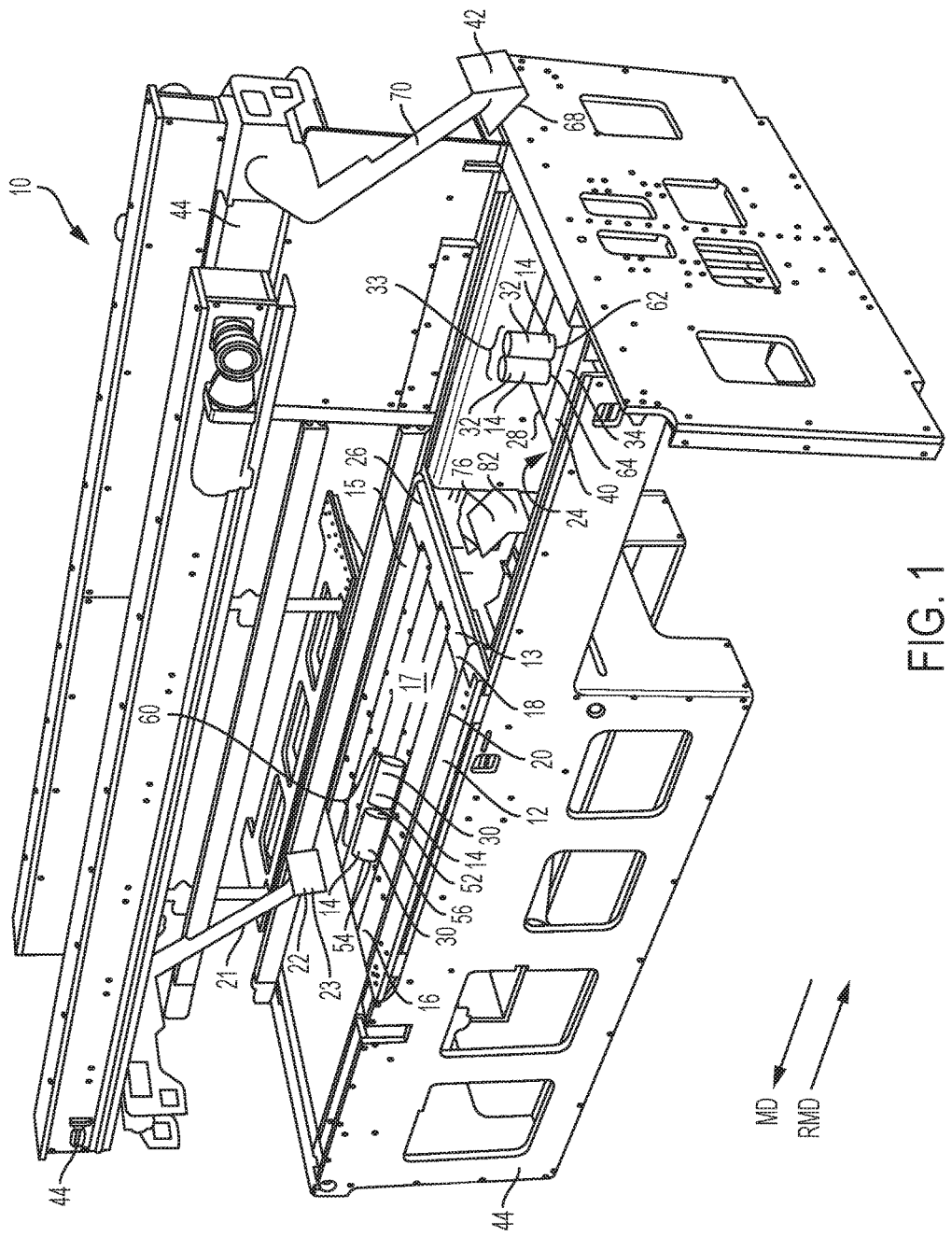
FIG. 1 is a perspective view of an apparatus according to one nonlimiting embodiment of the present invention.

FIG. 1 depicts an apparatus 10 for reorienting and/or stacking according to one embodiment of the present invention. In general, the apparatus 10 may include an infeed 12 on which one or more products 14 are advanced in a machine direction. The infeed 12 comprises a receiving end 16 where products 14 enter the infeed 12, a transfer end 18 where products 14 exit the infeed 12, and an infeed surface 17 on which the products 14 are advanced from the receiving end 16 to the transfer end 18. In one nonlimiting example, the infeed 12 comprises a conveyor 13 having a conveying belt 15 such that the one or more products 14 are conveyed in the machine direction. In another nonlimiting example, the infeed surface 17 does not convey and/or is static. In one embodiment, the infeed 12 comprises a telescopic infeed 20.

The products 14 can be advanced in the machine direction. In an embodiment, a product 14 is advanced at an advance rate. A layer pusher 22 may be used to advance the product 14 on the infeed 12. In an embodiment, a conveyor 13 is used to advance the products 14. In a further embodiment, a layer pusher 22 is used in conjunction with a conveyor 13 to advance the products 14.

The products 14 can be advanced beyond the transfer end 18 and then can land in a landing region 24 proximate to the transfer end 18. The transfer end 18 can be disposed at a first elevation 26. A landing surface 34 in the landing region 24 may be disposed at a second elevation 28, which in one nonlimiting example is lower than the first elevation 26. In one nonlimiting example, a product 14 is advanced in a first orientation 30 and lands in a second orientation 32 that is different than the first orientation 30. In a further embodiment, the transfer end 18 of a telescopic infeed 20 retracts at a nominal retract rate, while the products 14 are advanced beyond the transfer end 18. In such way, multiple products 14 may be disposed in a single layer 33 in the landing region 24. In an alternative embodiment, the transfer end 18 is static while the products 14 are advanced beyond the transfer end 18.

Figure 2:
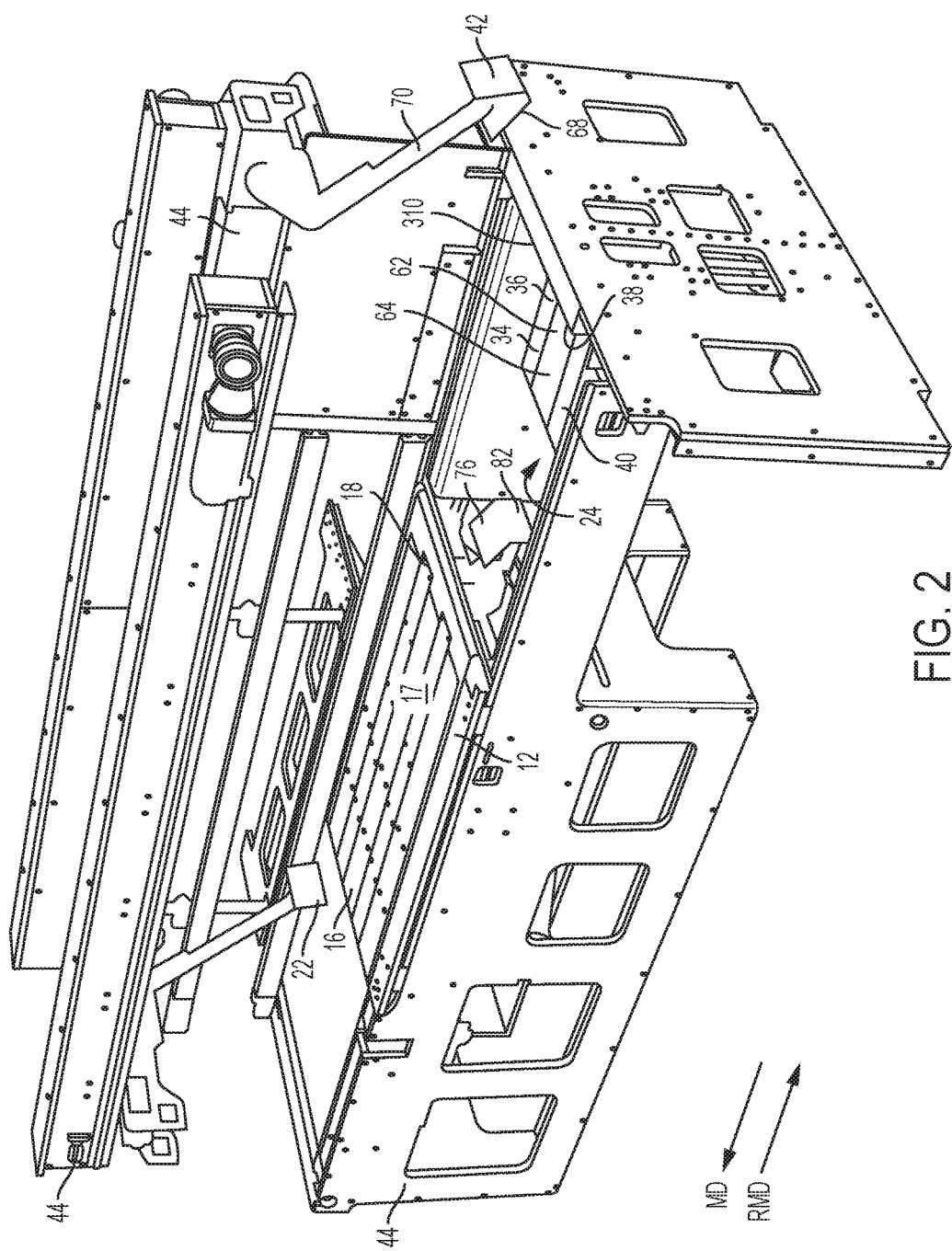
FIG. 2 is a perspective view of an apparatus according to another nonlimiting embodiment of the present invention.

As shown in FIG. 2, the landing surface 34 may comprise a shiftable landing surface 36 that moves such that multiple products 14 may be disposed in a single layer 33 on the surface 36. The landing surface 34 may comprise a securing mechanism 38 to help secure a product 14 to the landing surface 34. In a further embodiment, a lift 40 may be disposed in the landing region 24 and be coterminous with or operatively engageable with the landing surface 34. The lift 40 may be moveable to different elevations. In this way, as discussed below, the lift 40 may be used to form a stack of products 14. The apparatus 10 may further comprise an ejector 42 disposed in or proximate to the landing region 24. The ejector 42 may be used to eject a product 14 from the landing surface 34 or landing region 24.

Apparatus

The apparatus 10 may further comprise a frame 44. The frame 44 may be one unitary component or multiple associated pieces. The frame 44 may be comprised of any material(s) suitable for holding, mounting, attaching or otherwise associating the various parts described herein.

Figure 3A:
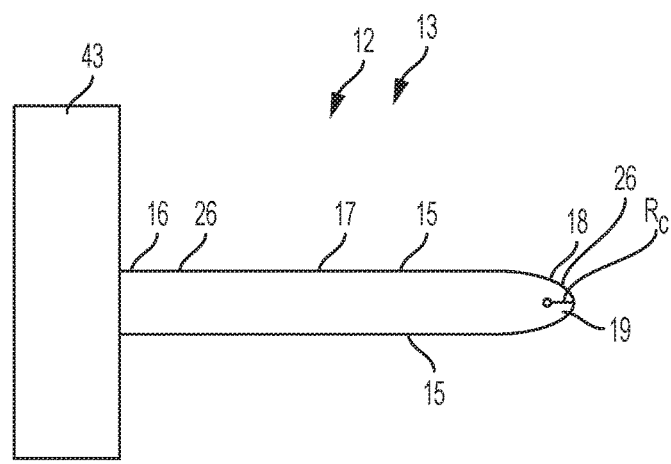
FIGS. 3A-3C are schematic representations of infeeds in accordance with various nonlimiting embodiments of the present invention.
Figure 3B:
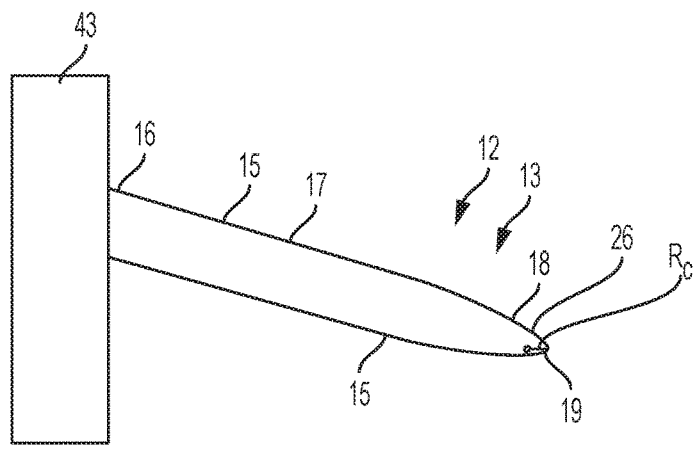
Figure 3C:
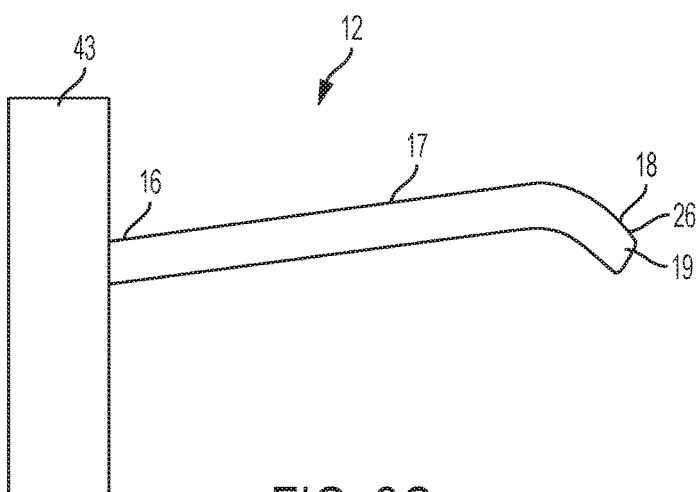

As shown in FIGS. 1 and 3C, the infeed 12 may be associated with the frame 44. The infeed 12 comprises a receiving end 16 where one or more products 14 enter the infeed 12. The infeed 12 further comprises a transfer end 18 where the one or more products 14 exit the infeed 12 and an infeed surface 17 upon which products 14 may be advanced from the receiving end 16 to the transfer end 18 in a machine direction. The receiving end 16 and the transfer end 18 may be disposed at the same elevation 26 (e.g., FIG. 3A) or at different elevations (e.g., FIG. 3B). The majority of the infeed surface 17 may be macroscopically planar (e.g., FIG. 3A) or macroscopically non-planar (e.g., FIG. 3C). The transfer end 18 may further comprise a nose 19 which may comprise a radius of curvature, $R_c$ (as shown in FIGS. 3A and 3B). In some embodiments, the infeed 12 comprises a conveyor 13 having a conveying belt 15 which may wrap around the nose 19 and a form at least a part of the infeed surface 17.

Figure 4:
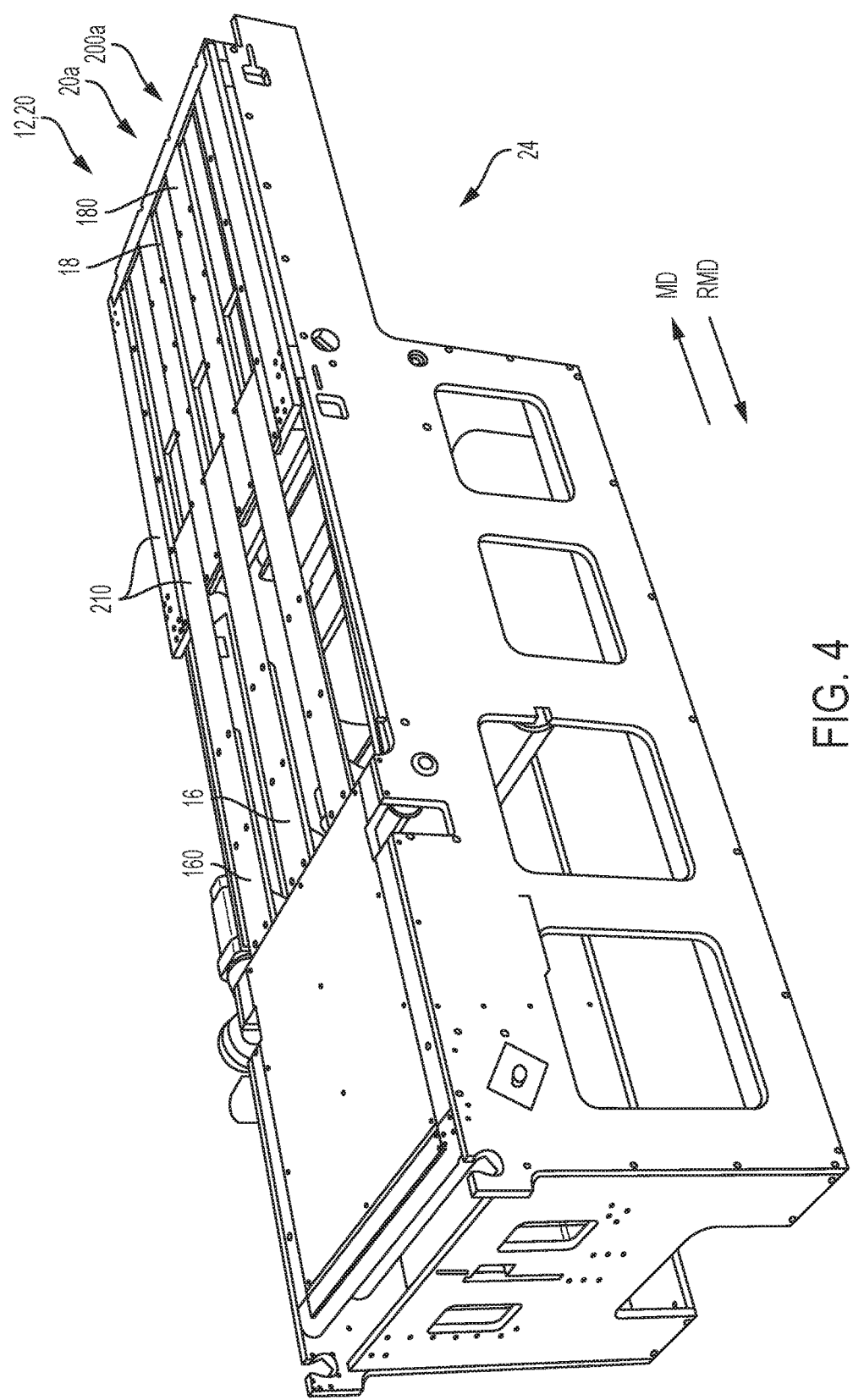
FIG. 4 is a perspective view of an infeed in accordance with one nonlimiting embodiment of the present invention.
Figure 5:
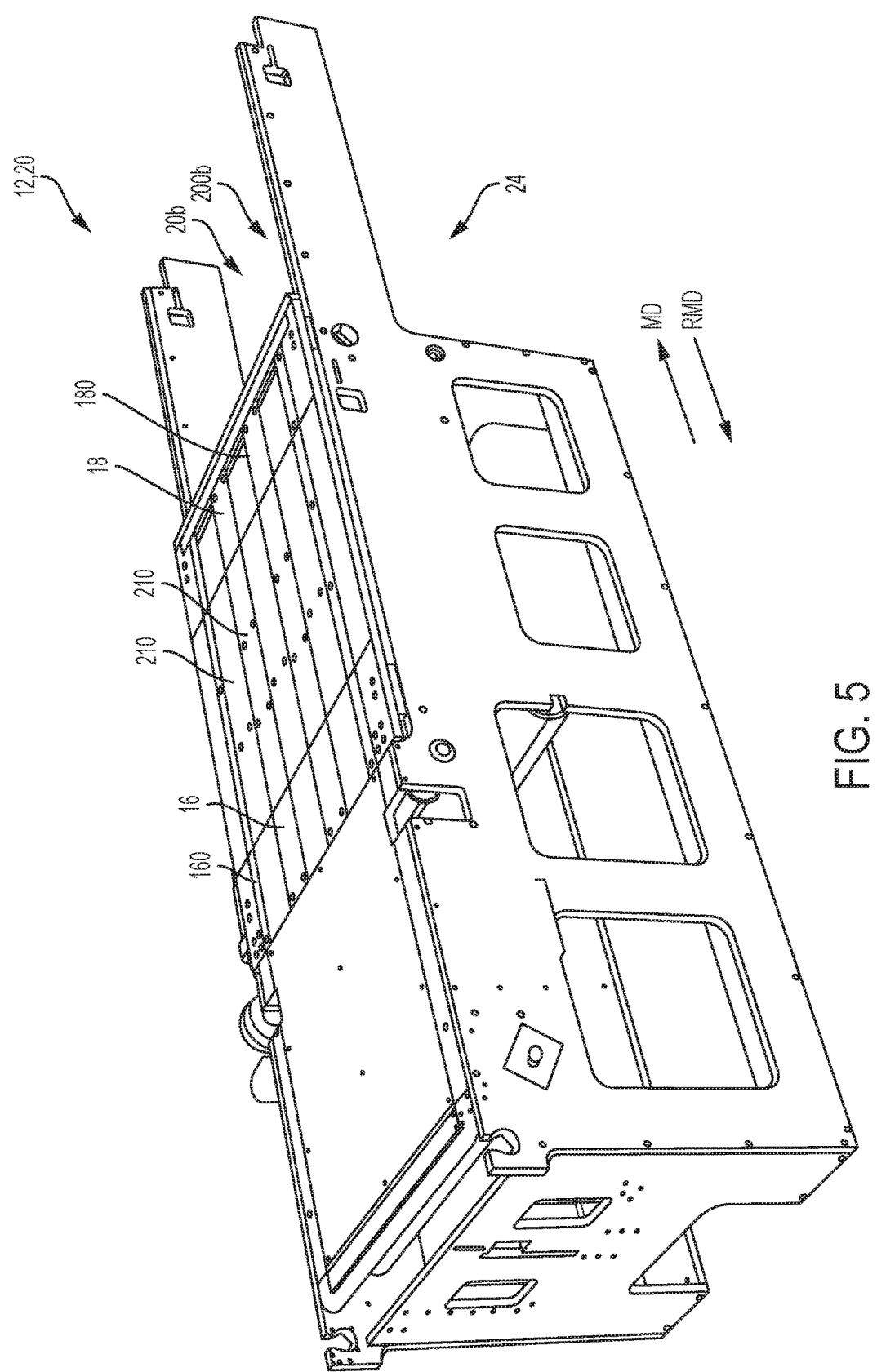
FIG. 5 is a perspective view of the infeed of FIG. 4 in a retracted position.

The receiving end 16 of the infeed 12 has a receiving end operating plane 160 as depicted in FIGS. 4 and 5. FIG. 4 depicts the transfer end 18 in an extended position 20a (with the surface 17—e.g., a conveying belt 15—removed for illustrative purposes), while FIG. 5 shows the transfer end 18 in a retracted position 20b (with the surface 17—e.g., a conveyor belt 15—removed for illustrative purposes). The receiving end operating plane 160 is the plane intersecting the majority of the infeed surface 17 at the receiving end 16. The transfer end 18 comprises a transfer end operating plane 180, which is the plane intersecting the majority of the infeed surface 17 that the product 14 contacts at the transfer end 18 just before leaving the infeed 12. While the surface 17 is not illustrated in FIGS. 4 and 5, the respective planes 160, 180 are schematically shown where they would intersect the surface 17. Further, although FIGS. 4 and 5 depict a telescopic infeed 20, the operating planes 160, 180 are present regardless of whether the infeed 12 is telescoping or not.

Figure 6:
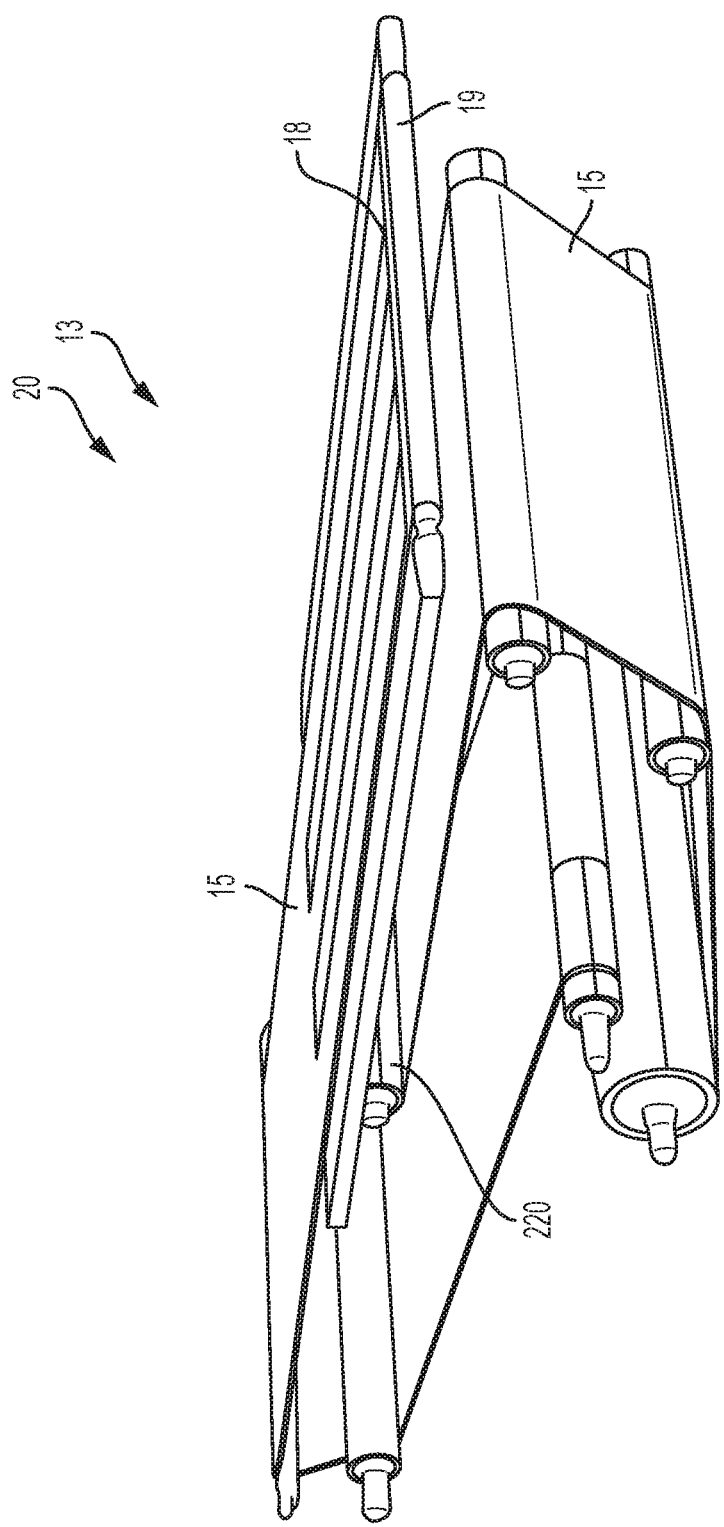
FIG. 6 is a partial perspective view of a telescopic infeed in accordance with one nonlimiting embodiment of the present invention.
Figure 7A:
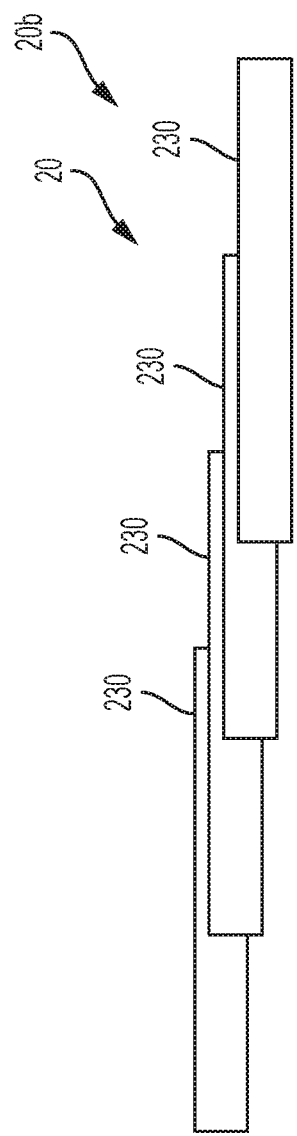
FIGS. 7A and 7B are schematic representations of a telescopic infeed in accordance with nonlimiting embodiments of the present invention.
Figure 7B:
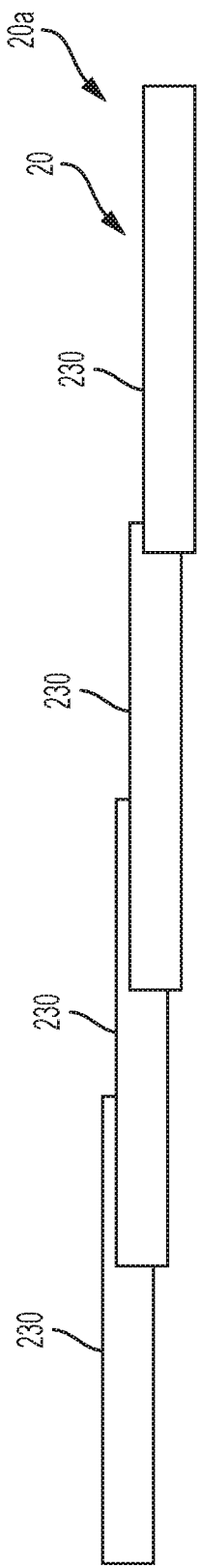

In an embodiment, the infeed 12 may comprise a telescopic infeed 20 wherein the transfer end 18 can extend and retract as shown, for example, in FIGS. 4 and 5. In an embodiment, the transfer end 18 is extendable in the machine direction and retractable in the reverse machine direction as shown by the arrows in FIGS. 4 and 5. The extended position 20a may comprise an originating position 200a where the transfer end 18 is disposed when a layer 33 of products is started in the landing region 24. The retracted position 20b may comprise a terminating position 200b where the transfer end 18 is disposed when the layer 33 is completed in the landing region 24. The extension and/or retraction may be accomplished by any means known in the art. In one nonlimiting example, the telescopic infeed 20 comprises mating plates 210 that are slideably associated to permit extension and retraction as shown in FIGS. 4 and 5. In embodiments where the infeed 12 comprises a conveyor 13, the slack in the conveying belt 15 that occurs during retraction of the transfer end 18 may be directed to a moveable shaft 220 (shown in FIG. 6) that moves in conjunction with the transfer end 18 to compensate for the changes in length caused by extending and retracting the transfer end 18. In another nonlimiting example shown in FIGS. 7A and 7B, the transfer end 18 may comprise a series of overlapping sections 230 that are associated such that in a retracted position 20b, the overlapping sections 230 overlap more than they overlap in an extended position 20a.

In one embodiment, the transfer end 18 may extend at a nominal extension rate and/or retract at a nominal retract rate. In one nonlimiting example, the nominal retract rate may be from about 50 ft/min to about 300 ft/min, or from about 100 ft/min to about 250 ft/min, or about 160 ft/min, reciting for each range every 10 ft/min therebetween. In one nonlimiting example, the transfer end 18 is retracted at a substantially constant retract rate, which remains substantially constant during the duration of the retraction (i.e., the nominal retract rate is substantially constant and used throughout the duration of the retraction). In another nonlimiting example, the transfer end 18 retracts at a variable retract rate, which changes during the duration of the retraction. In such nonlimiting example, the variations in the retract rate may average out to the nominal retract rate over the duration of the retraction. Similarly, the transfer end 18 may extend in the machine direction at a constant rate equal to the nominal extension rate or at a variable rate which averages out to the nominal extension rate. During the operation, the extension rates (constant or variable) may be the same as or different from the rates of retraction (constant or variable).

In an embodiment, the transfer end 18 may be moved according to a movement profile in which the direction, distances and/or rates of motion at various points during the operation are predetermined. In one nonlimiting example, the movement profile may comprise indexing the transfer end 18. In one nonlimiting example, indexing the transfer end 18 comprises pausing the transfer end 18 when a product 14 is advanced beyond the transfer end 18 (i.e., pausing in close temporal proximity or at the exact time as the product 14 loses contact with the transfer end 18). In another nonlimiting example, the movement profile comprises extending the transfer end 18 in the MD at one or more points during operation, such that the transfer end 18 may contact one or more products 14 to help orient the products 14 and/or reposition the products 14 (e.g., close the distance between products 14) while or after the products 14 are advanced over the transfer end 18. The movement profile may comprise any combination of workable rates. Where the movement profile comprises varying rates, each varying rate may average out (over the duration of the operation) to the respective nominal rate.

In another embodiment, the transfer end 18 does not retract or extend. Regardless of the movement or the lack of movement of the transfer end 18, one or more products 14 are advanced on the infeed 12 in the machine direction.

Turning to FIG. 8A, products 14 may enter the infeed 12 at the receiving end 16. The products 14 may comprise any shape suitable for advancement on the infeed 12 and reorienting and/or stacking. In one nonlimiting example, a product 14 comprises a generally parallelepiped structure such as a package used for sanitary tissue products 46. The package 14 may contain a plurality of sanitary tissue products 46 (e.g., a stack of tissues) or a plurality of rolled sanitary tissue products 48. In a further embodiment, the products 14 may comprise a cylindrical shape, such as a single rolled product 48. In still a further embodiment, the one or more products 14 may comprise a combination of different shapes and/or sizes. Alternatively, the products 14 may comprise substantially the same shape and/or size. A product 14 may comprise two or more sides 50 which may include a leading end 52, a trailing end 54 substantially opposite the leading end 52 and a face 56 extending between the leading end 52 and the trailing end 54.

In an embodiment, a product 14 is disposed on the receiving end 16 in a first orientation 30. The first orientation 30 may comprise the leading end 52 being disposed more proximate to the transfer end 18, the trailing end 54 being disposed away from the transfer end 18 and the face 56 being disposed on the infeed surface 17 as shown in FIG. 8A. In one nonlimiting example, the face 56 (or a tangent line running through the face 56) is substantially parallel to the receiving end operating plane 160. After being advanced over the transfer end 18, the product 14 may land in the landing region 24 in a second orientation 32 as illustrated in FIG. 8B. The second orientation 32 is different from the first orientation 30. In one nonlimiting example, the second orientation 32 may comprise the leading end 52 or the trailing end 54 being disposed on the landing surface 34. The landing surface 34 may have a primary landing plane 340, which is the plane intersecting the majority of the landing surface 34. In one nonlimiting example, the leading end 52 and/or trailing end 54 may be substantially parallel to the primary landing plane 340. As an additional nonlimiting example, in the first orientation 30, a leading end 52 may be substantially perpendicular to the receiving end operating plane 160; and in the second orientation 32, said leading end 52 may be substantially parallel to a primary landing plane 340.

In other words, in the first orientation 30, the product 14 may be advanced on its face 56 and, in the second orientation 32, the product 14 may land on its leading end 52 or trailing end 54. In one nonlimiting example, the first orientation 30 is perpendicular to the second orientation 32. As shown in FIGS. 8A and 8B, two products 14a, 14b may comprise different first orientations 30a, 30b (i.e., product 14a's leading end is structurally equivalent to product 14b's face) but the relationship between their respective first orientations 30a, 30b and their respective second orientations 32a, 32b may be the same. In an alternative embodiment, one or more products 14 may be disposed on the receiving end 16 in a first orientation 30 and land in the landing region 24 in the same, first orientation 30 as shown in FIG. 9. In this sense, the apparatus 10 may be used for stacking (discussed more below) without reorienting (e.g., upending) the products 14.

In one embodiment (shown for example in FIG. 10A), a first product 14a and second product 14b are disposed on the infeed 12 such that the trailing end 54a of the first product 14a is proximate to the leading end 52b of the second product 14b. In such way, the first and second products 14a, 14b form a line 60 on the infeed 12. In one nonlimiting example, the products 14a, 14b are substantially the same length. In another nonlimiting example, the products 14a, 14b comprise different lengths.

Returning to FIG. 1, the product(s) 14 may be advanced in the machine direction. In one embodiment, the infeed 12 comprises a conveyor 13 and the conveyance of the products 14 by the conveyor 13 constitutes advancing the products 14. In another embodiment, the apparatus 10 includes a layer pusher 22 to advance one or more products 14. A layer pusher 22 may be used in conjunction with a conveyor 13 or without a conveyor 13. In one nonlimiting example, the layer pusher 22 may move at a rate or advance a product 14 at a rate that exceeds the rate of conveyance. Further, the layer pusher 22 may be associated with the frame 44. In one nonlimiting example, the layer pusher 22 is slideably associated with the frame 44. In another nonlimiting example, the layer pusher 22 is associated with the frame 44 through an arm 21 that is attached to the frame 44 as shown in FIG. 1. In yet another nonlimiting example, the layer pusher 22 is associated with the infeed 12 and/or another portion of the apparatus 10. In still another nonlimiting example, the layer pusher 22 is operatively engageable with the infeed 12 such that the layer pusher 22 may contact one or more products 14 disposed on the infeed 12. The layer pusher 22 may advance the products 14 through a pushing, pulling, grabbing and lifting motion, a combination of such motions, or any other movement that would aid in moving a product 14 from the receiving end 16 to the transfer end 18 or otherwise aid in advancing the product 14 in the machine direction. The layer pusher 22 may contact a product 14 on the leading end 52, trailing end 54 and/or face 56. The layer pusher 22 may be returned to an originating position 23 after advancing one or more products 14. The movement of the layer pusher 22 may be achieved by any suitable means.

The products 14 may be advanced at a nominal advance rate. In an embodiment, the layer pusher 22 advances the product 14 at the nominal advance rate. The nominal advance rate may comprise a substantially constant rate throughout the duration of the advancement of the product 14. Alternatively, the nominal advance rate may comprise a variable advance rate, wherein (over the duration of the operation) the rate variations average out to the nominal advance rate. In one embodiment, the advance rate may coordinate with the nominal retract rate. In this way, the layer pusher 22 may reliably advance products 14 over the transfer end 18 just as the transfer end 18 retracts and, in one nonlimiting example, the coordination allows for products 14 to land at a predetermined pitch distance, $D_{preset}$, apart as shown in FIG. 10B. In another nonlimiting example, where multiple products 14a, 14b are advanced, the retract and advance rates may coordinate mathematically according to the following formula:

$$\frac{R_{RET}}{R_{ADV}} = D_{preset} / (D_{layer} - D_{preset})$$

where:
$R_{RET}$ is the nominal retract rate of the transfer end 18;
$R_{ADV}$ is the nominal advance rate;
$D_{preset}$ is the predetermined pitch distance between products 14a, 14b in the landing region 24; and
$D_{layer}$ is the pitch between the products 14a, 14b on the infeed 12, and where $D_{layer}$ is greater than $D_{preset}$.

The rates may coordinate through any other algorithm suitable for the operation of the present invention.

In another nonlimiting example, the nominal advance rate is 100 ft/min to about 500 ft/min, or about 150 ft/min to about 300 ft/min or about 220 ft/min, reciting for each range every 10 ft/min interval therebetween. In one nonlimiting example, the movement profile includes a variable retract rate and a variable advance rate. The variable advance rate may vary proportionally with and/or at the same intervals as the variable retract rate. The variations in the variable retract rate may average out to the nominal retract rate over the duration of the operation and/or the variations in the variable advance rate may average out to the nominal advance rate over the duration of the operation.

One or more products 14 may be advanced over the transfer end 18 of the infeed 12 and into a landing region 24 proximate to the transfer end 18. The landing region 24 may comprise one or more landing surfaces 34.

As noted above and shown in FIG. 10A, a first product 14a and a second product 14b may be disposed on the infeed 12 in a line 60. The products 14a, 14b may be advanced (e.g., conveyed) in the line 60. The first product 14a may be advanced over the transfer end 18 and land on the landing surface 34 before the second product 14b is advanced over the transfer end 18. The second product 14b may subsequently land on the surface 34 proximate to the first product 14a to form a primary layer 330 comprising the first and second products 14a, 14b as shown in FIG. 10B. The second product 14b may be disposed a pitch distance, $D_{a-b}$, from the first product 14a. In an embodiment, the pitch distance, $D_{a-b}$, is predetermined according to an algorithm as discussed above or otherwise predetermined.

In one nonlimiting example shown in FIG. 1, a telescopic infeed 20 is used and the transfer end 18 retracts as the products 14a, 14b are advanced. In such nonlimiting example, the retraction of the transfer end 18 may allow the first product 14a to be disposed on the landing surface 34 at a first position 62 and the second product 14b to be subsequently disposed on the landing surface 34 at a second position 64. In another nonlimiting example shown in FIG. 2, the landing surface 34 may comprise a shiftable landing surface 36 capable of moving such that the first product 14a may land on the surface 36 at first position 62 and the second product 14b may land on the surface 36 at a second position 64.

The shiftable landing surface 36 may shift translationally, rotationally or by another manner sufficient to permit products 14a, 14b to land at different positions on the surface 36 and/or to permit stacking of products (discussed more fully below). The entire surface 36 or a portion of the surface 36 may be shiftable. In one nonlimiting example, the shiftable landing surface 36 is a conveyor. In a further nonlimiting example, the shiftable landing surface 36 is a telescopic infeed. The shiftable landing surface 36 may move in a predetermined manner in accordance with the movement profile. The shiftable landing surface 36 may move in an indexing fashion.

Figure 11A:
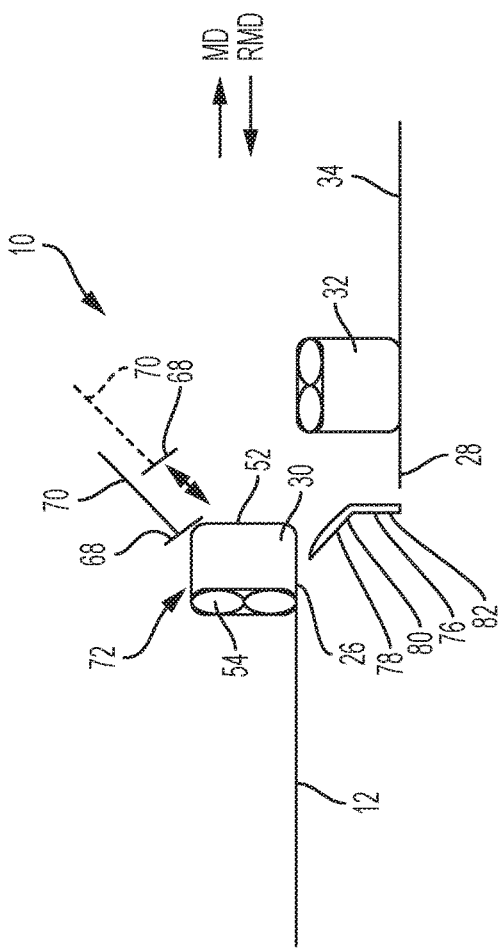
FIGS. 11A and 11B are schematic representations of portions of an apparatus in accordance with nonlimiting embodiments of the present invention.
Figure 11B:
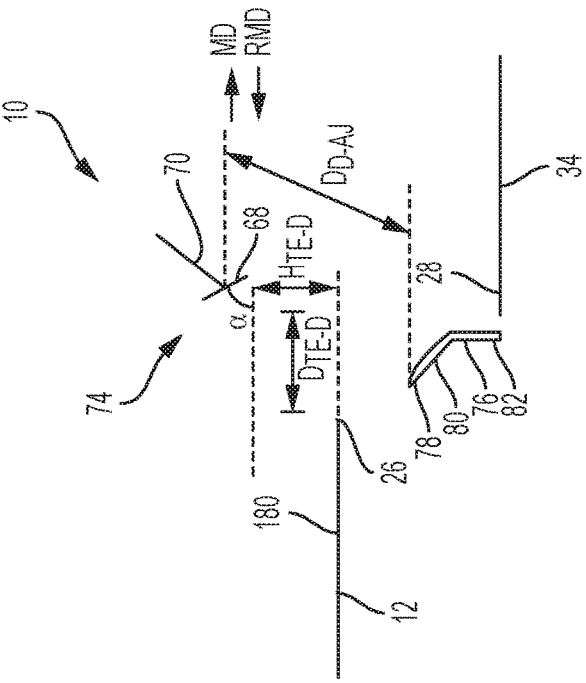

Turning to FIGS. 11A and 11B, a landing surface 34 may be disposed at a second elevation 28. The second elevation 28 may be lower than the first elevation 26. In a nonlimiting example, the landing surface 34 may be moved to different elevations. In such nonlimiting example, the landing surface 34 may be disposed at the second elevation 28 when at least one product 14 lands on the landing surface 34. In an alternative nonlimiting example, the landing surface 34 is disposed at the first elevation 26 when a product 14 lands thereon (see FIG. 9). Additional features in FIGS. 11A and 11B are discussed in more detail in the Reorientation Features section below.

Figure 12A:
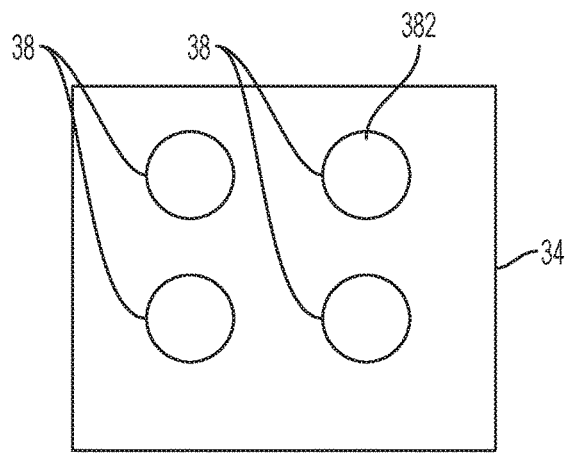
FIGS. 12A-12C are schematic representations of securing mechanisms in accordance with nonlimiting embodiments of the present invention.
Figure 12B:
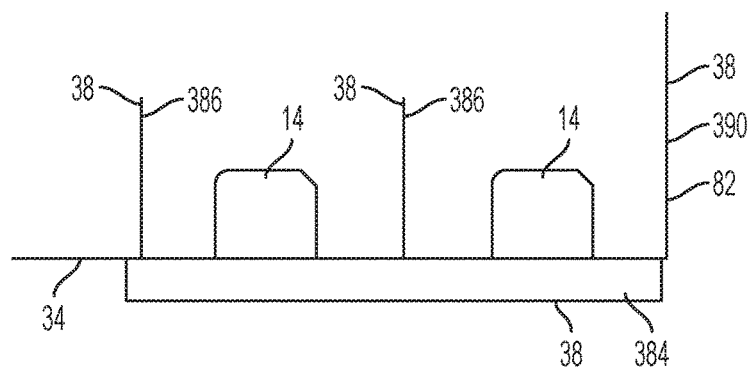
Figure 12C:
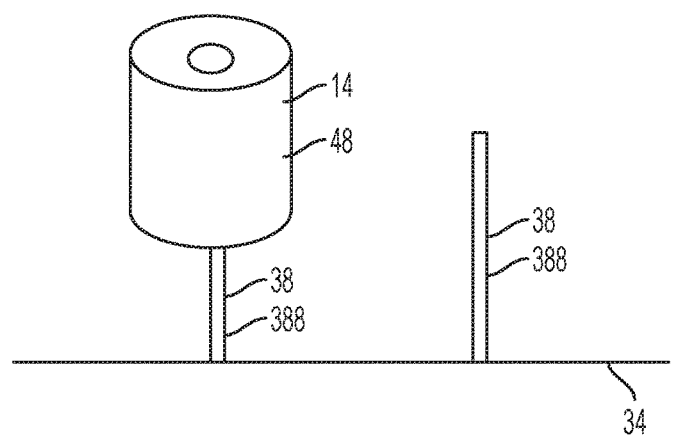
Figure 13A:
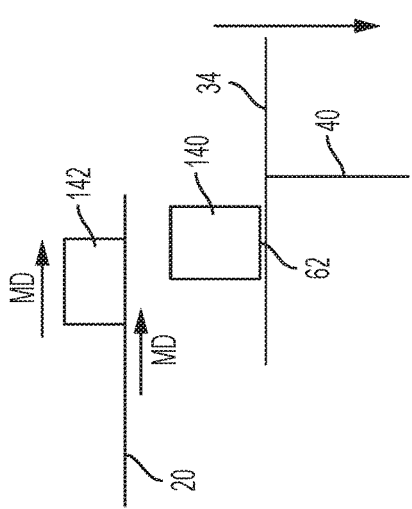
FIGS. 13A-13D are schematic representations of the progression of products in accordance with one nonlimiting embodiment of the present invention.
Figure 13B:
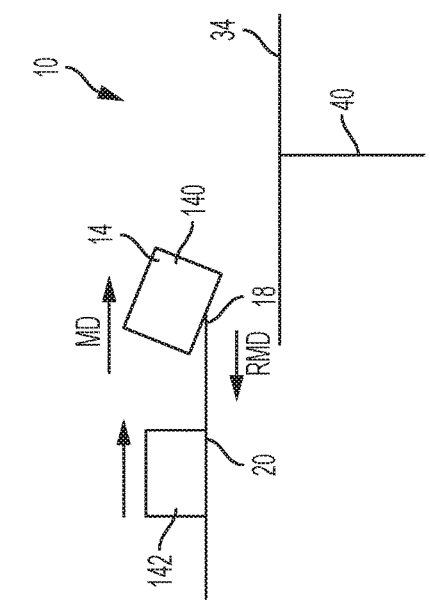
Figure 13C:
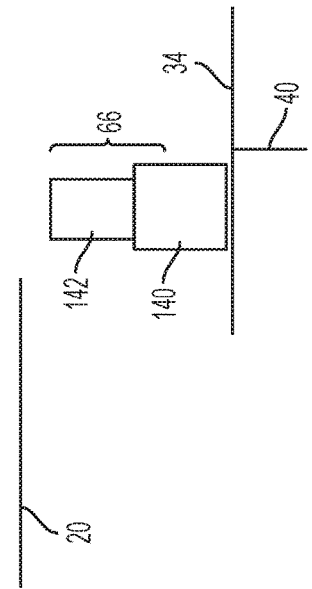
Figure 13D:
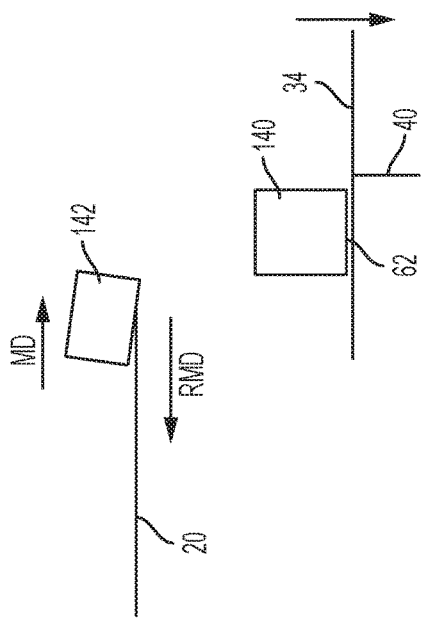

Further, the landing surface 34 may comprise a securing mechanism 38 to help secure a product 14 to the landing surface 34 at a particular location and/or in a particular orientation. As illustrated in FIG. 12A (schematically depicting a top view of a landing surface), the securing mechanism 38 may comprise a pocket system wherein the surface 34 comprises pockets 382 (e.g., carve outs, indentations, raised portions or other features) that surround or partially surround the perimeter of the product 14. In another nonlimiting example shown in FIG. 12B, the securing mechanism 38 comprises a vacuum 384 that pulls the product 14 towards the surface 34. In yet another nonlimiting example, the securing mechanism 38 comprises one or more gates 386 (e.g., plates or pillars) extending from the surface 34 that can be disposed such that a product 14 may land between two gates 386 or two products 14 may land on either side of one gate 386. The gates 386 may be collapsible, retractable or capable of laying substantially flat on the surface 34. In yet another nonlimiting example, the securing mechanism can comprise a bar 388 (as illustrated in FIG. 12C) about which the center of a rolled product 48 (e.g., the center of a paper towel roll) may surround. The bars 388 may be collapsible, retractable or capable of laying substantially flat on the surface 34. The securing mechanism 38 may comprise a combination of any of the foregoing or any other mechanism suitable for securing product 14 to the surface 34 at a particular location and/or in a particular orientation. In a further embodiment, a securing mechanism 38 may be made to remain fixed in place while the landing surface 34 is moved to a different elevation or otherwise moved, such that one or more products 14 clear the securing mechanism 38 before being transferred or ejected from the landing surface 34.

The landing surface 34 may also comprise one or more retention plates 390 to retain a product 14 on the landing surface 34. In one nonlimiting example, a retention plate 390 also serves as a securing mechanism 38 (see FIG. 12B). Retention plates 390 may be disposed on one or more sides of the landing surface 34 or at other points along the landing surface 34 to extent workable. Further, the retention plates 390 may be made of a low friction material, to minimize any disruption to the trajectory of a product 14 which may be caused by the retention plates 390. The retention plates 390 may be retractable, removable or otherwise moved as necessary, for example, to eject a product 14. In a further nonlimiting example, a retention plate 390 may remain stationary while the landing surface 34 is moved to a different elevation or otherwise shifted such that one or more products 14 clear the retention plate 390 before being ejected or transferred from the landing surface 34. Additional features of 12B will be discussed below.

The apparatus 10 may further comprise a lift 40 in operative relationship with the landing surface 34 as illustrated for example in FIGS. 13A-15E. The lift 40 may be used to change the elevation of a product 14 by changing the elevation of the landing surface 34, directly contacting the product 14 or any other means suitable for changing the product's 14 elevation. In one nonlimiting example, the lift 40 is used to the lower a product 14. As discussed in further detail in the Stacking Features section, the lift 40 may be utilized to create a stack 66 of products, wherein the stack 66 may comprise a secondary layer product 142 disposed on a primary layer product 140. Additional features shown in FIGS. 13A-15E will be discussed below.

In a further embodiment, the apparatus 10 comprises an ejector 42 to eject a product 14 from the landing surface 34 or from the landing region 24. The ejector 42 may be disposed proximate to the landing surface 34. The ejector 42 may comprise any shape suitable for ejecting one or more products 14 such as a plate-like structure or a structure conforming to the perimeter or a portion of the perimeter of the product 14. The ejector 42 may be conterminous with or joined with one or more portions of the apparatus 10. In one nonlimiting example, the ejector 42 is joined with a deflector 68 (discussed below) as shown for example in FIG. 1. The ejector 42 and deflector 68 may be joined such that one side of the dual component serves as the deflector 68 and another side serves as the ejector 42. The deflector 68/ejector 42 combination may provide different functions at different locations (i.e., deflecting when positioned proximate to the transfer end 18, then moving to an ejecting position). In one nonlimiting example, the ejector 42 ejects a product 14 from the landing surface 34 onto the lift 40 as depicted in FIGS. 15A-15E. In a further nonlimiting example, the ejector 42 may be joined with or coterminous with an adjuster 76 (discussed below) and/or an alignment pusher 82 (also discussed below). In some embodiments, the apparatus 10 may comprises more than one ejector 42.

Additional features and details regarding the operation and components of the apparatus 10 are discussed below.

Reorientation Features

As discussed above, a product 14 may be advanced in a first orientation 30 and land in the landing region 24 in a second orientation 32 that is different from the first orientation 30. The change in orientation may be facilitated by the landing surface 34 being disposed at a second elevation 28, which is lower than the first elevation 26 (the first elevation 26 being where the transfer end 18 is disposed). In one embodiment, the change in orientation may be facilitated by the relative process rates (e.g., nominal advance rate, conveyance rate and/or nominal retract rate). In another nonlimiting example, the change in orientation may be facilitated by the shape of the transfer end 18 and/or the angle of the transfer end operating plane 180 with respect to the portion of the infeed 12 adjacent to the transfer end 18 (see, e.g., FIG. 3C). In still another nonlimiting example, the change in orientation may be facilitated by the radius of curvature, $R_c$, of the nose 19.

In a further embodiment, the change in orientation may be assisted by the use of a deflector 68 in operative relationship with the transfer end 18. In one nonlimiting example, the deflector 68 may be associated with the frame 44 as shown in FIG. 1. The deflector 68 may be attached to the frame 44 with an arm 70. Alternatively, the deflector 68 may be associated with another portion of the apparatus 10. In one nonlimiting example, the deflector 68 is disposed proximate to the transfer end 18 such that the deflector 68 may contact a product 14 being advanced over the transfer end 18 to cause a shift in the product's 14 orientation. Generally, the deflector 68 interferes with the trajectory of the product 14 in a way to reorient the product 14. In a further nonlimiting example, the deflector 68 is disposed proximate to the transfer end 18 such that the deflector 68 may contact the leading end 52 of a product 14 and deflect said leading end 52 towards the landing region 24 and/or in the direction of the desired landing orientation.

Returning to FIGS. 11A and 11B, the deflector 68 may be moveable such that it may be disposed proximate to the transfer end 18 in a deflecting position 72 and away from the transfer end 18 in a retreating position 74. In a further nonlimiting example, the deflecting position 72 may comprise the deflector 68 engaging with the leading end 52 of a product 14, and then the deflector 68 may move into its retreating position 72 to avoid contact with the trailing end 54 of said product 14.

The deflector 68 may comprise any shape suitable for aiding in the change of orientation, including but not limited a plate-like surface or a structure conforming to the shape of the product 14. In one nonlimiting example, the deflector 68 is disposed at an angle, a, of from about 20 degrees to about 80 degrees, or from about 30 degrees to about 60 degrees, or about 45 degrees with respect to the transfer end operating plane 180 as shown in FIG. 11B. The deflector 68 may be multiple associated pieces or one unitary piece.

The deflector 68 may be disposed at any workable elevation and any workable distance from the transfer end 18. In one nonlimiting example, the deflector 68 is disposed higher than the first elevation 26 (where the transfer end 18 is disposed). The deflector may be disposed an elevation distance, $H_{TE-D}$, of from about 30 mm to about 1000 mm, or from about 50 mm to about 500 mm, or from about 60 mm to about 100 mm, or about 84 mm above or below the transfer end 18 as measured from the lowest point on the deflector 68 to the highest point on the transfer end 18. The elevation distance, $H_{TE-D}$, may vary based on a product's 14 height (i.e., how tall the product 14 is when disposed on the infeed surface 17).

In another nonlimiting example, the deflector 68 is disposed a lateral distance, $D_{TE-D}$, from the transfer end 18 (where the lateral distance, $D_{TE-D}$, is the shortest distance between the deflector 68 and the transfer end 18) of from about 50 mm to 500 mm, or from about 100 mm to 400 mm, or from about 150 mm to about 350 mm, or about 255 mm, for each range reciting every 10 mm interval therebetween. The lateral distance, $D_{TE-D}$, can be any workable distance and may vary based on a product's 14 length in the machine direction on the infeed surface 17. When a telescopic infeed 20 is utilized, the deflector 68 may move in a manner that coordinates with the movement of the transfer end 18, including but not limited to moving in the machine direction and/or the reverse machine direction. In one nonlimiting example, the deflector 68 moves in the same direction as the transfer end 18 extends and at the same nominal extension rate and/or moves in the same direction as the transfer end 18 retracts and at the same nominal retract rate. Alternatively, the deflector 68 may move at different rates (e.g., slightly slower or faster than the transfer end 18 or in an indexing manner) and/or in different directions than the transfer end 18 at one or more periods during the operation. In a further nonlimiting example, the deflector 68 moves in a predetermined manner in accordance with the movement profile. In another nonlimiting example, the deflector 68 and transfer end 18 maintain substantially the same lateral distance, $D_{TE-D}$, during the reorientation operation.

The skilled person will recognize that the shape, elevation and/or distance of the deflector 68 may be varied depending on the movement profile, rates of the various components (e.g., advance rate, retract rate, extension rate, rate of conveyance), product dimensions, product weight, other properties of the deflector 68 (e.g., the shape, elevation and/or distance of the deflector 68 with respect to the transfer end 18, material from which the deflector 68 is made) and other variants that could affect the ease or difficulty of changing a product's 14 orientation.

In one embodiment also shown for example in FIG. 11A, a change in orientation of one or more products 14 may be facilitated by an adjuster 76 in operative relationship with the transfer end 18. While the deflector 68 may be used to interfere with a product's trajectory to initiate a shift in orientation, the adjuster 76 may be used to guide a product 14 as or after the shift in orientation has started. In one nonlimiting example, the adjuster 76 may additionally cause a subsequent or further shift in orientation. In another nonlimiting example, the adjuster 76 comprises a shape 78 that facilitates guiding a product 76 into a particular orientation (e.g., the second orientation 32). The shape 78 may comprise any form suitable for this purpose including but not limited to a slide or a chute 80 as shown in FIGS. 11A and 11B. In some embodiments, the adjuster 76 may be joined with and/or coterminous with the alignment pusher 82 (discussed below).

In a further embodiment, the adjuster 76 guides the product 14 while or after the product 14 has advanced beyond the transfer end 18 and is moving under the force of gravity. In one nonlimiting example, where a telescopic infeed 20 is used, the adjuster 76 may move such that the adjuster's 76 movement correlates with the movement of the transfer end 18. In one nonlimiting example, the adjuster 76 moves in the reverse machine direction and/or in the machine direction. In a further nonlimiting example, the adjuster 76 moves at the same rates as the transfer end 18. In another nonlimiting example, the adjuster 76 may move in a predetermined manner according to the movement profile. In still another nonlimiting example, the adjuster 76 moves in the machine direction at a different rate than the transfer end extension rate and/or moves in the reverse machine direction at a different rate than the transfer end retract rate. The adjuster 76 may move in an indexing manner. In one nonlimiting example, the adjuster 76 moves in an indexing manner while the transfer end 18 retracts and a first product 14a and second product 14b are individually advanced over the transfer end 18. In such nonlimiting example, the adjuster 76 may pause or slow down as it guides the first product 14a and then move relatively quickly to the next position in order to guide the second product 14b.

In a further embodiment, the adjuster 76 is used in conjunction with the deflector 68. In one embodiment, the adjuster 76 may move in tandem with the deflector 68. Alternatively, the adjuster 76 may move at different rates than the deflector 68 to the extent the apparatus 10 works for its intended purpose. In another embodiment, the deflector 68 and adjuster 76 are separated by an operating distance, $D_{D-AJ}$ (as measured from the closest two points on the deflector 68 and adjuster 76), which may be maintained throughout the reorientation operation. In still a further embodiment, the adjuster 76 may be used without the deflector 68 or vice versa.

The adjuster 76 may be disposed proximate to the transfer end 18 at any workable elevation and distance with respect to the transfer end 18. In one embodiment, the adjuster 76 is disposed below the first elevation 26 (where the transfer end 18 is disposed) such that the adjuster 76 contacts a falling product 14. In alternative embodiments, the adjuster 76 may be disposed at the first elevation 26 or higher than the first elevation 26 as measured from the highest point on the adjuster 76 to the lowest point on the surface 17 at the transfer end 18.

The shape 78, elevation and/or distance of the adjuster 76 may be varied depending on the movement profile, rates of the various components (e.g., advance rate, retract rate, extension rate, rate of conveyance), product dimensions, product weight, other properties of the adjuster 76 (e.g., the shape 78, elevation and/or distance of the adjuster 76 with respect to the transfer end 18, material from which the adjuster 76 is made) and other variants that could affect the ease or difficulty of guiding a product 14 and/or changing a product's 14 orientation. The adjuster 76 may comprise multiple associated pieces or one unitary piece. The adjuster 76 is primarily useful in ensuring a product 14 is rotated or otherwise adjusted to the correct trajectory (or within an acceptable range of rotation). That is, an over-rotated or under-rotated product 14 will be guided by the adjuster 76 such that its trajectory is corrected to permit said product 14 to land in the desired orientation.

Aligning Product or Layers

The apparatus 10 may comprise an alignment pusher 82 to align one or more products 14, or a layer of products 33, disposed in the landing region 24. The alignment pusher 82 may be disposed proximate to or within the landing region 24. The alignment pusher 82 may contact one or more of the products 14. In a further embodiment, the alignment pusher 82 may be moved to straighten or otherwise alter the orientation of a product 14 and/or moved to adjust the pitch distance, $D_{a-b}$, between two products 14a, 14b. In one nonlimiting example, the alignment pusher 82 moves translationally to push products 14a, 14b closer together.

The alignment pusher 82 may comprise any shape suitable for aligning one or more products 14 in the landing region 24, including but not limited a plate-like surface or a structure conforming to the shape of the product(s) 14. Further, the alignment pusher 82 may be disposed at any workable elevation and any workable distance from the transfer end 18.

The alignment pusher 82 may be coterminous with or joined to one or more portions of the apparatus 10. In one nonlimiting example shown in FIG. 11A, the alignment pusher 82 is coterminous with or joined to the adjuster 76 with, for example, a shape 78 that permits guiding the product 14 into a particular orientation and/or into the landing region 24 and manner of movement that permits aligning the product 14. In another nonlimiting example shown in FIG. 12B, the alignment pusher 82 may be coterminous with or joined to a retention plate 390, where for example, the dual component is used to retain products 14 for a period before moving to align said products 14. In still another nonlimiting example illustrated in FIG. 15A, the alignment pusher 82 may be coterminous with or associated with the ejector 42. The dual alignment pusher 82/ejector 42 may operate align a product 14 against a backing surface (such as a retention plate 390) which subsequently retracts or is removed such that the component may eject the product 14 from the landing surface 34. Alternatively, the alignment pusher 82/ejector 42 may align the product 14 or layer 33 while ejecting said product 14 or layer 33 from the landing surface 34. In an additional nonlimiting example, the alignment pusher 82 may operate to align products 14 disposed on the lift 40 (e.g., after said products 14 have been removed from the landing surface 34).

The movement of the alignment pusher 82 may coordinate with the advance rate, the extension rate, and/or retract rate (if applicable). In a further nonlimiting example, the movement profile may include predetermined rates, directions and/or distances for the movement of the alignment pusher 82.

The shape, elevation and/or distance of the alignment pusher 82 may be varied depending on the movement profile, rates of the various components (e.g., advance rate, retract rate, extension rate, rate of conveyance), product dimensions, product weight, other properties of the alignment pusher 82 (e.g., the shape, elevation and/or distance of the alignment pusher 82 with respect to the transfer end 18, material from which the alignment pusher 82 is made) and other variants that could affect the ease or difficulty of aligning one or more products 14. The alignment pusher 82 may comprise multiple associated pieces or one unitary piece.

Stacking Features

Turning to FIGS. 13A-15E, in some embodiments, the apparatus 10 may be used to form a stack 66 of products. A primary layer product 140 and a secondary layer product 142 can be advanced. The primary layer product 140 may be advanced beyond the transfer end 18 before the secondary layer product 142 is advanced beyond the transfer end 18. The secondary layer product 142 may subsequently be disposed on the primary layer product 140 to form a stack 66.

In one nonlimiting example, the secondary layer product 142 may land on a portion of the primary layer product 140 after advancing beyond the transfer end 18.

In another nonlimiting example, the apparatus 10 comprises a lift 40 operatively engaged with the landing surface 34. The lift 40 may be coterminous with or associated with the landing surface 34 such that the lift 40 may cause the landing surface 34 to move to different elevations, such as a lower elevation. Alternatively, the lift 40 may be disposed proximate to the landing surface 34 such that the lift 40 can receive one or more products 14 or a layer 33 of products 14 from the landing surface 34. The lift 40 may be elevationally moveable and/or otherwise capable of moving a primary layer product 140 to a different elevation. In one nonlimiting example, the lift 40 lowers the primary layer product 140.

FIGS. 13A-13D are schematic representations of an embodiment depicting the MD movement of products 14, the MD extension and the RMD retraction of a transfer end of a telescopic infeed 20, and the lowering of one or more products 14 using the lift 40. In such embodiment, a telescopic infeed 20 is used and the transfer end 18 retracts as each product 140, 142 is advanced over the transfer end 18. The primary layer product 140 may land at a first position 62. The transfer end 18 may extend in the machine direction after the primary product 140 is advanced over the transfer end 18, permitting the secondary layer product 142 to be positioned such that the secondary layer product 140 may land on the primary layer product 140. The lift 40 may be used to lower the landing surface 34, and the secondary layer product 142 may advance over the transfer end 18 and land on the primary layer product 140 to form a stack 66.

Figure 14B:
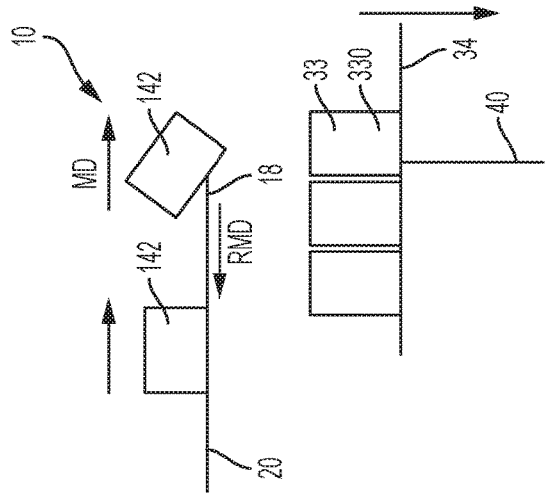
FIGS. 14A-14C are schematic representations of the progression of products in accordance with another nonlimiting embodiment of the present invention.
Figure 14C:
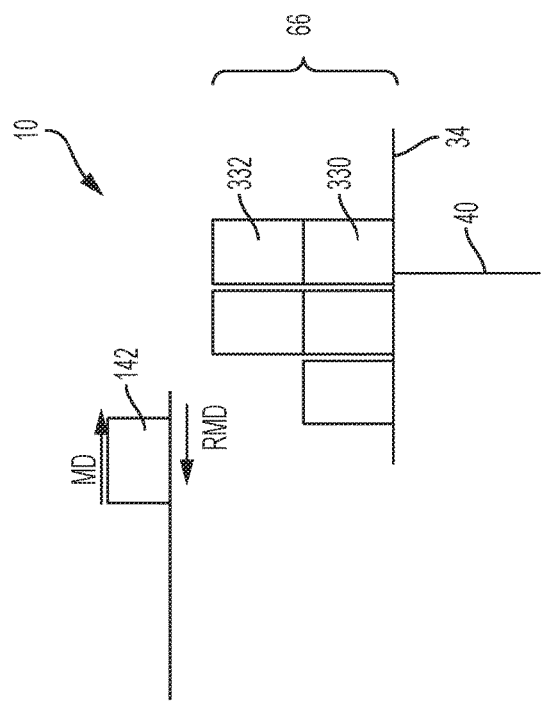
Figure 14A:
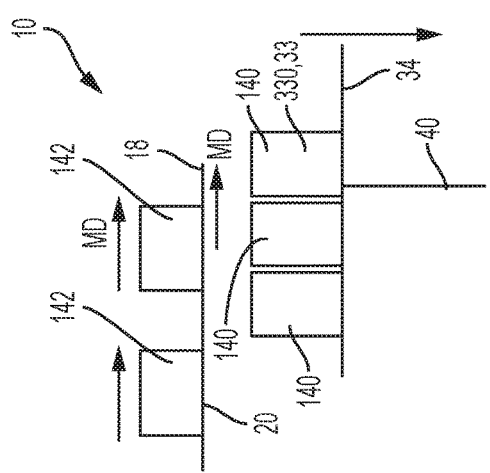

FIGS. 14A-14C schematically represent another embodiment and depict the MD movement of products 14, the MD extension and the RMD retraction of a transfer end of a telescopic infeed 20, and the lowering of a primary layer 330 of products using the lift 40. In such embodiment, a plurality of primary layer products 140 may be advanced into the landing region 24 to create a primary layer 330, and subsequently one or more secondary layer products 142 may be advanced beyond the transfer end 18 such that the secondary layer product(s) land on the primary layer 330 to form a stack 66. The stack 66 may comprise the primary layer 330 and a secondary layer 332.

In another embodiment, a shiftable landing surface 36 may be used which shifts prior to the secondary layer product 142 being advanced over the transfer end 18. The primary layer product may land in a first position 62. The shiftable landing surface 36 may shift to permit the secondary layer product 142 to be positioned such that said secondary layer product 142 may land on the primary layer product 140. In one nonlimiting example, the shiftable landing surface 36 reverses directions in order to position the secondary layer product 142. The lift 40 may be used to lower the landing surface 34, and the secondary layer product 142 may advance over the transfer end 18 and land on the primary layer product 140. In such embodiment, the transfer end 18 of the infeed 12 may remain substantially static during the stacking operation.

In an alternative embodiment shown in FIGS. 15A-15E, the primary layer product 140 or a primary layer 330 may be ejected from the landing surface 34 before a secondary layer product 142 lands on the landing surface 34. In this way, the next reorientation sequence may begin without waiting for changes in elevation related to stacking and/or ejection of a layer 33. This would allow for a greater portion of cycle time for reorientation, increase reliability and/or allow for higher throughput rates. By way of nonlimiting example, the transfer end 18 of a telescopic infeed 20 could be returning to its originating position 200a while products 14 are being ejected onto the lift 40. A secondary layer product 142 (or a secondary layer 332) may then be moved from the landing surface 34 to be disposed on the primary layer product 140 (or on the primary layer 330) to form a stack 66. In such embodiment, the primary layer product 140 may be lowered after or while being ejected from the landing surface 34. A telescopic infeed 20 and/or a shiftable landing surface 36 may be used to create a layer 33 on the landing surface 34.

For brevity, the description herein discusses a single product 14 being advanced over the transfer 18 at one time. However, multiple products 14 may be advanced over the transfer end 18 at the same time such that the products may comprise a row having multiple lanes of products. In other words, a layer 33 may comprise products 14 disposed both side-by-side and front-to-back (e.g., 8 products disposed in 2 lanes and 4 rows).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for reorienting and/or stacking products, the apparatus comprising:
   a frame;
   a telescopic infeed associated with the frame, the telescopic infeed having a receiving end and a transfer end, the transfer end being disposed at a first elevation and being moveable in a machine direction and in a reverse machine direction and wherein one or more products are advanced on the telescopic infeed in the machine direction;
   a landing surface to receive the one or more products, the landing surface being disposed in a landing region proximate to the transfer end and at a second elevation, wherein the first elevation is higher than the second elevation;
   a deflector operatively engageable with the transfer end, such that the deflector is capable of deflecting a leading end of at least one of the one of more products;
   a layer pusher operatively engageable with the telescopic infeed such that the layer pusher is capable of advancing the one or more products in the machine direction; and
   an adjuster in operative relationship with the transfer end of the telescopic infeed, the adjuster comprising a shape that facilitates guiding the at least one of the one or more products such that the at least one of the one or more products lands in the second orientation.

2. The apparatus of claim 1 wherein the telescopic infeed comprises a telescopic conveyor, wherein said telescopic conveyor is capable of conveying the one or more products in the machine direction.

3. The apparatus of claim 1 further comprising a lift operatively engageable with the landing surface, wherein the lift is elevationally moveable.

4. The apparatus of claim 3 wherein the lift is operatively engageable with the landing surface such that the lift is capable of disposing the landing surface at different elevations.

5. The apparatus of claim 3 wherein the lift is operatively engageable with the landing surface such that the lift is capable of receiving the one or more products from the landing surface.

6. The apparatus of claim 1 wherein at least one of the one or more products are advanced on the telescopic infeed in a first orientation at a nominal advance rate, and the transfer end is retractable in the reverse machine direction at a nominal retract rate, such that the at least one of the one or more products are received on the landing surface in a second orientation, the second orientation being different than the first orientation.

7. The apparatus of claim 1 wherein the deflector is disposed at an angle of about 20 degrees to about 80 degrees with respect to a transfer end operating plane.

8. The apparatus of claim 1 further comprising an ejector operatively engageable with the landing surface such that the ejector is capable of ejecting the one or more products from the landing surface.

9. The apparatus of claim 1 further comprising an alignment pusher disposed proximate to the landing region and moveable such that the alignment pusher is capable of aligning products disposed in the landing region.

10. The apparatus of claim 1 further comprising a retention plate associated with the landing surface.

11. The apparatus of claim 1 wherein the landing surface comprises a securing mechanism.

12. An apparatus for reorienting and/or stacking products, the apparatus comprising:
   a frame;
   a telescopic infeed associated with the frame, the telescopic infeed having a receiving end and a transfer end, the transfer end being disposed at a first elevation and being moveable in a machine direction and in a reverse machine direction and wherein one or more products are advanced on the telescopic infeed in the machine direction;
   a landing surface to receive the one or more products, the landing surface being disposed in a landing region proximate to the transfer end and at a second elevation, wherein the first elevation is higher than the second elevation; and
   a deflector operatively engageable with the transfer end, such that the deflector is capable of deflecting a leading end of at least one of the one of more products;
   an alignment pusher disposed proximate to the landing region and moveable such that the alignment pusher is capable of aligning products disposed in the landing region; and
   an adjuster in operative relationship with the transfer end of the telescopic infeed, the adjuster comprising a shape that facilitates guiding the at least one of the one or more products such that the at least one of the one or more products lands in the second orientation.

13. The apparatus of claim 12 wherein the telescopic infeed comprises a telescopic conveyor, wherein said telescopic conveyor is capable of conveying the one or more products in the machine direction.

14. The apparatus of claim 12 further comprising a layer pusher operatively engageable with the telescopic infeed such that the layer pusher is capable of advancing the one or more products in the machine direction.

15. The apparatus of claim 12 further comprising a lift operatively engageable with the landing surface, wherein the lift is elevationally moveable.

16. The apparatus of claim 15 wherein the lift is operatively engageable with the landing surface such that the lift is capable of disposing the landing surface at different elevations.

17. The apparatus of claim 15 wherein the lift is operatively engageable with the landing surface such that the lift is capable of receiving the one or more products from the landing surface.

18. The apparatus of claim 12 wherein at least one of the one or more products are advanced on the telescopic infeed in a first orientation at a nominal advance rate, and the transfer end is retractable in the reverse machine direction at a nominal retract rate, such that the at least one of the one or more products are received on the landing surface in a second orientation, the second orientation being different than the first orientation.

19. The apparatus of claim 12 wherein the deflector is disposed at an angle of about 20 degrees to about 80 degrees with respect to a transfer end operating plane.

20. The apparatus of claim 12 further comprising an ejector operatively engageable with the landing surface such that the ejector is capable of ejecting the one or more products from the landing surface.

21. The apparatus of claim 12 further comprising a retention plate associated with the landing surface.

22. The apparatus of claim 12 wherein the landing surface comprises a securing mechanism.

23. The apparatus of claim 12 wherein the landing surface comprises a shiftable landing surface.

* * * * *